US005682165A

United States Patent [19]

Lewis et al.

[11] Patent Number: 5,682,165

[45] Date of Patent: Oct. 28, 1997

[54] ACTIVE ARRAY SELF CALIBRATION

[75] Inventors: Gib F. Lewis, Manhattan Beach; Eric N. Boe, Long Beach, both of Calif.

[73] Assignee: Hughes Electronics, Los Angeles, Calif.

[21] Appl. No.: 643,132

[22] Filed: May 2, 1996

[51] Int. Cl.[6] .............. G01S 7/40

[52] U.S. Cl. .............. 342/174; 342/372; 342/196

[58] Field of Search .............. 342/173, 174, 342/196, 368, 371, 372

[56] References Cited

U.S. PATENT DOCUMENTS

| | | | |
|---|---|---|---|
| 4,488,155 | 12/1984 | Wu | 342/376 |
| 5,093,649 | 3/1992 | Johnson | 342/157 |
| 5,223,846 | 6/1993 | Campbell | 342/372 |
| 5,367,305 | 11/1994 | Volker et al. | 342/368 |
| 5,374,935 | 12/1994 | Forrest | 342/368 |
| 5,559,519 | 9/1996 | Fenner | 342/174 |
| 5,572,219 | 11/1996 | Silverstein et al. | 342/375 |

*Primary Examiner*—John B. Sotomayor

*Attorney, Agent, or Firm*—Leonard A. Alkov; Wanda K. Denson-Low

[57] ABSTRACT

A process for collecting phase and amplitude calibration data for an active array system without the use of external sensors. The relative phase and amplitudes of adjacent T/R modules are determined when viewed through the entire array system. The calibration process involves collecting and storing these phases and amplitudes for future use. A pulse-to-pulse phase or amplitude modulation mode is employed. An element is commanded into this mode to separate its signal (in frequency) from competing signals and leakages from the surrounding modules. A T/R inversion command allows for a single element to be switched to a transmit state while the remainder of the array is in the receive state. This provides for a reference signal during receive calibration, and for single module testing during transmit calibration.

12 Claims, 8 Drawing Sheets

ACTIVE ARRAY SELF CALIBRATION

TECHNICAL FIELD OF THE INVENTION

This invention relates to techniques for calibration of phased array antenna systems, and more particularly to a technique for collecting phase and/or amplitude calibration data for a phased array system without the use of external sensors.

BACKGROUND OF THE INVENTION

One known approach to array calibration is a two step process. First, phase and amplitude calibration information is collected at a subarray level. Then the subarrays are assembled, the feeds are attached, and the array is re-calibrated as a whole unit. The re-calibration process requires the use of a high-power nearfield scanner and its associated hardware.

This known approach to array calibration has several disadvantages. The high-power nearfield scanner is a very expensive asset. The calibration/phase-up process takes many test hours with this asset. The high-power nature of the scanner requires special safety considerations. The calibration process can only be performed in the laboratory with the use of the high-power scanner. No field calibration of the transmit/receive (T/R) modules of the system is possible. Field testing of the T/R module functionality requires the use of an external sensor. Finally, distributed-monopulse-hybrid calibration requires the injection of an identical signal into each of the monopulse hybrids.

SUMMARY OF THE INVENTION

One aspect of the invention is a technique for collecting phase and amplitude calibration data for an active array system without the use of external sensors, such as a planar nearfield. The relative phase and amplitudes of T/R modules are determined when viewed through the entire array system. The calibration process involves collecting and storing these phases and amplitudes for future use. A pulse-to-pulse phase or amplitude modulation mode is employed. An element is commanded into this mode to separate its signal (in frequency) from competing signals and leakages from the surrounding modules. A single element is switched to a transmit state while the remainder of the array is in the receive state. This provides for a reference signal during receive calibration, and for single module testing during transmit calibration.

Thus, in accordance with the invention, a method for receive self calibration of an active RF antenna array system is described, comprising the following steps:

(a) placing a radar absorbing hat over the array aperture;

(b) setting the transmit drive to an appropriate level to obtain linear operation of the receive module;

(c) setting a given T/R module under test to a receive state;

(d) setting a reference T/R module to a transmit state;

(e) setting all other T/R modules in the array except the module under test and the reference module to a safe state so as not to transmit or receive through said other modules;

(f) receiving pulses of RF energy at the module under test via its corresponding radiating element which has been transmitted through the reference module via its corresponding radiating element;

(g) changing the state of the phase shifting circuitry of the receive module under test on a pulse-to-pulse or between groups of pulses to add phase modulation to the received pulses of energy to collect measurement data;

(h) analyzing the measurement data to determine the relative phase difference between the transmit module and the receive module under test;

(i) repeating the calibration for other modules in the array to obtain a set of data indicating the relative phase differences between the modules in the array, wherein only one module is transmitting and only one module is receiving during a test of a module under test; and (j) storing the set of data for use in setting the phase shifters for accurate receive beam forming.

A receive amplitude calibration method is further described, wherein amplitude modulation is applied on the signal by the module under test, by incrementing the module's gain control circuitry to decrease the amplitude from pulse to pulse. A Fourier transform is performed on the measured data, and the transformed spectrum is analyzed to provide a check on functionality of the gain control circuitry and to measure the relative amplitudes between the reference module and the module under test.

Similar transmit phase and amplitude calibration methods are described, which are similar to the receive calibration methods except that the module under test is set to transmit, and the reference module is set to receive.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

The purpose of this invention is to provide a way of collecting active array calibration data without the use of an external sensor system, such as a planar nearfield. The technique provides a way of performing array self-calibration, and requires only the use of an external radar-absorbing hat. The array self-calibration process is broken down into the following components: 1) receive calibration, receive phase calibration and receive amplitude calibration procedures, 2) transmit calibration procedure, transmit phase calibration procedure, transmit amplitude calibration procedure, and transmit calibration limitations, 3) propagation of error effects (clumping), 4) system requirements, and 5) test requirements. These components will be discussed in turn.

1(A). Receive Calibration Procedure

The following module commands and test setups are used for all receive calibration tests. The system setup procedures (200) are illustrated in the flow diagram of FIG. 11.

1. An RF-absorbent hat 40 (FIG. 12) is placed over the array to limit element-to-element signals to those due solely to mutual coupling (step 202). The hat is typically a fitted box which slides over the array. The inside of the hat is lined with RF-absorbent material 42.
2. The system may require a reduced transmit drive level dependent on module receive characteristics (step 204). The level of this drive shall be such that the coupled power from the transmit module at the input to the receive module shall be equal to the maximum allowable for linear operation of the receive module.
3. For the transmit/receive (T/R) modules not under test, the high power amplifiers (HPAs) 112 (FIG. 13) are enabled to approximately the array thermal environment during normal operation. The modules are otherwise disabled, so as not to transmit or receive, in a "safe" state (step 206).
4. For the transmit reference module, the HPA 112 is enabled, the T/R bit is set to inverted so that it transmits while other modules receive (step 210).
5. For the receive module under test, the low noise amplifier (LNA) 116 (FIG. 13) is enabled, the T/R bit is set to normal, and the module is commanded into a mode using pulse-to-pulse phase or amplitude modulation to separate its signal in frequency from competing signals and leakages from the surrounding modules (step 212).

1(B). Receive Phase Procedure

Figure 12:
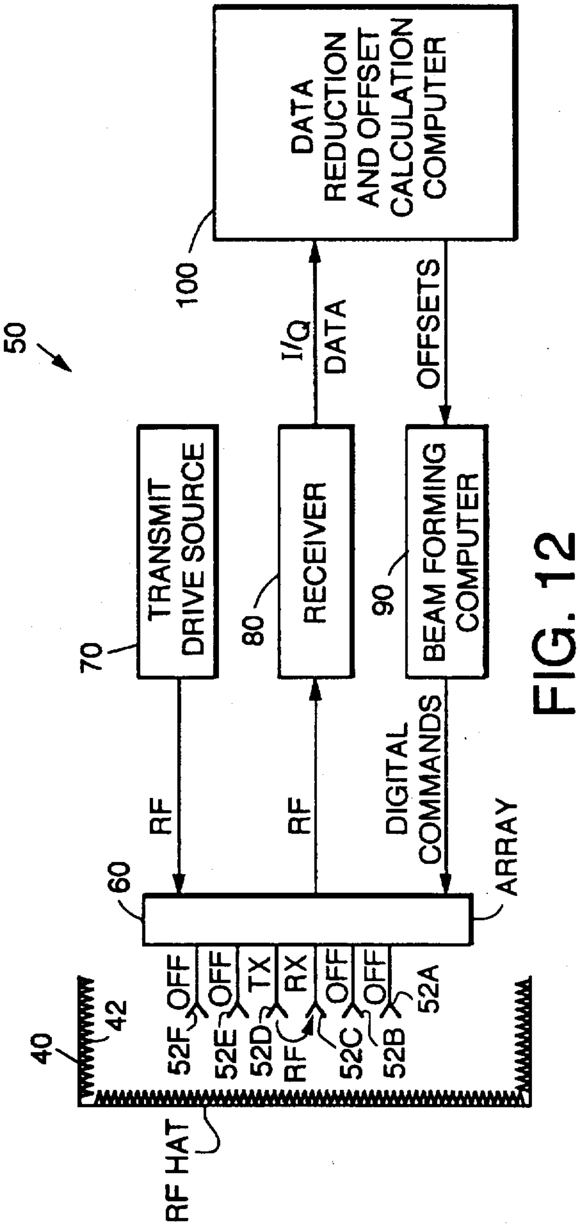
FIG. 12 is a system block diagram of an array system embodying the invention.

The procedure begins by commanding the whole array to a receive state. A reference module is switched to the transmit state by using the T/R inversion command built into the module's control circuitry. The module under test is then phase-modulated using a special command to increment the phase from pulse to pulse. Data is collected and processed as described in Eq. 1 and Eq. 2, and the derived phase offsets and states are stored in beamforming tables inside the beam forming computer 90 (FIG. 12).

The process uses successive refining to test each of the bits in the test module's phase shifter. The first test is to rotate the phase 0 degrees, 180 degrees, 0 degrees (360 degrees), 180 degrees (540 degrees), and so on. The next test is to rotate the phase 0 degrees, 90 degrees, 180 degrees, 270 degrees, 0 degrees (360 degrees), 90 degrees (450 degrees) and so on. The process is repeated to the finest level on phase control of the module.

Figure 1:
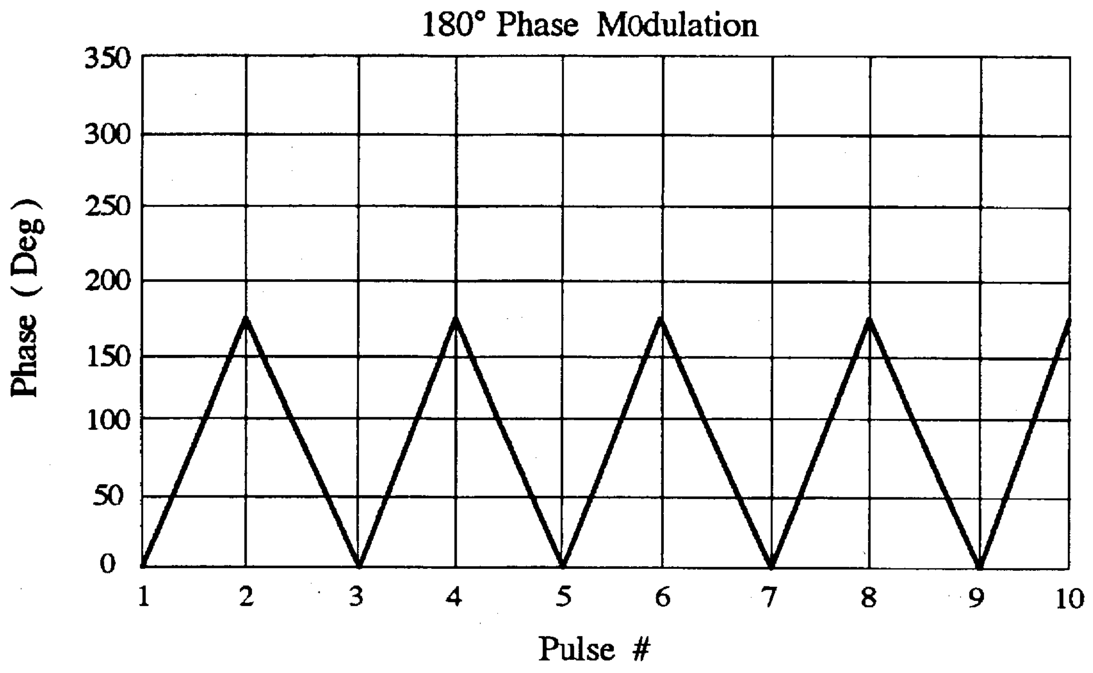
FIG. 1 shows typical data collected for a 180 degree phase modulation in the receive phase procedure in accordance with the invention.
Figure 2:
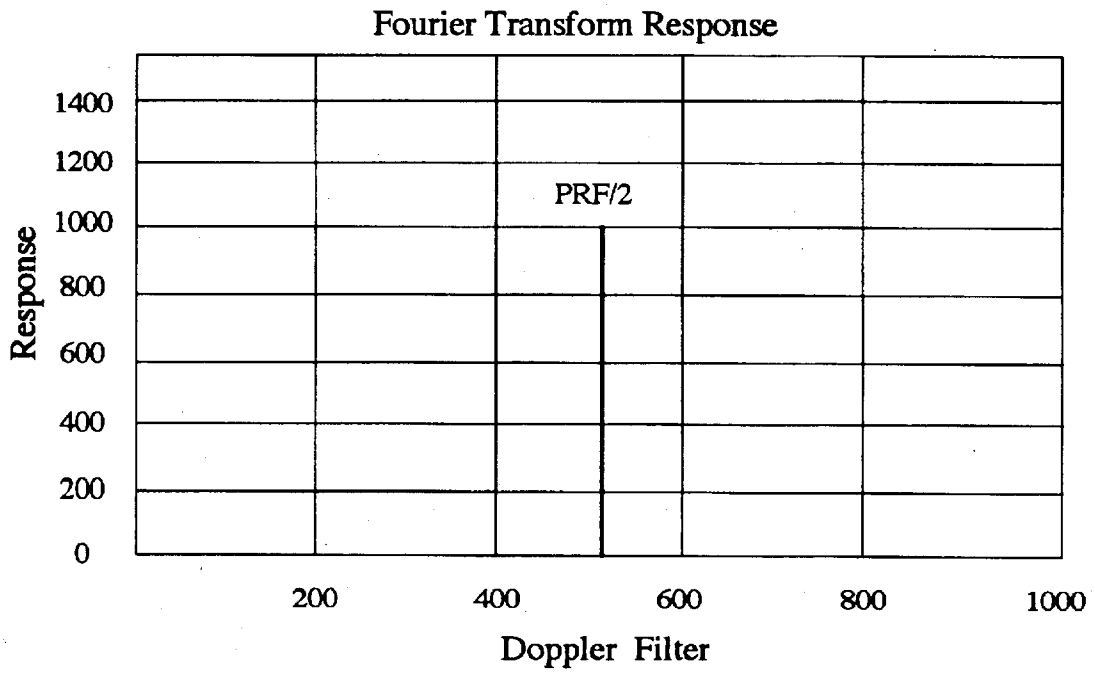
FIG. 2 shows the Fourier transform of the 180 degree phase modulation data of FIG. 1.
Figure 3:
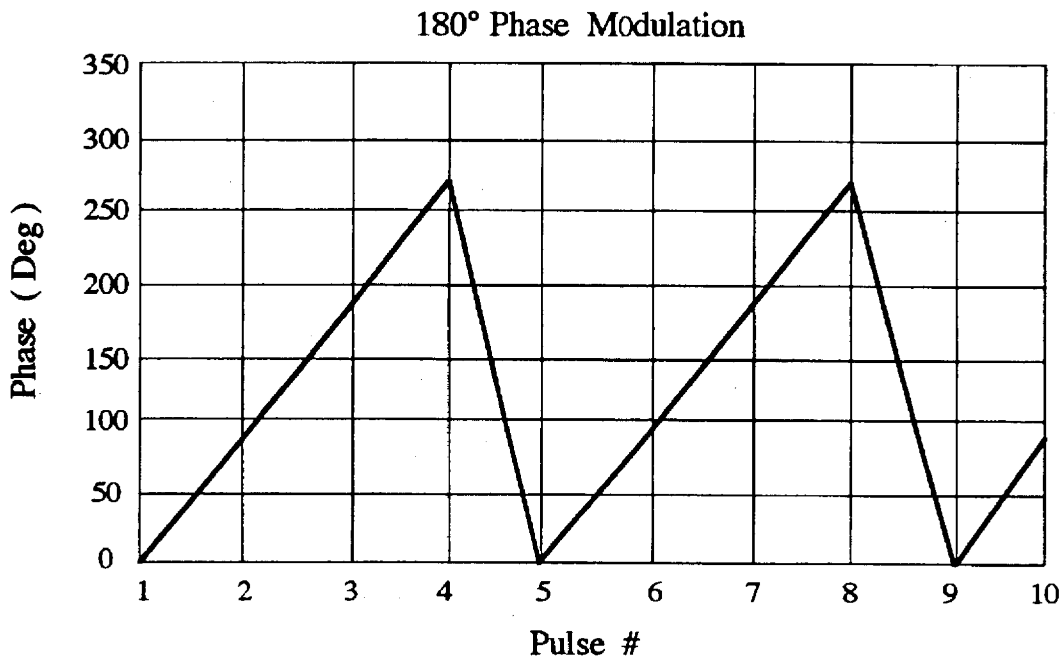
FIG. 3 shows typical data collected for a 90 degree phase modulation in the receive phase procedure in accordance with the invention.
Figure 4:
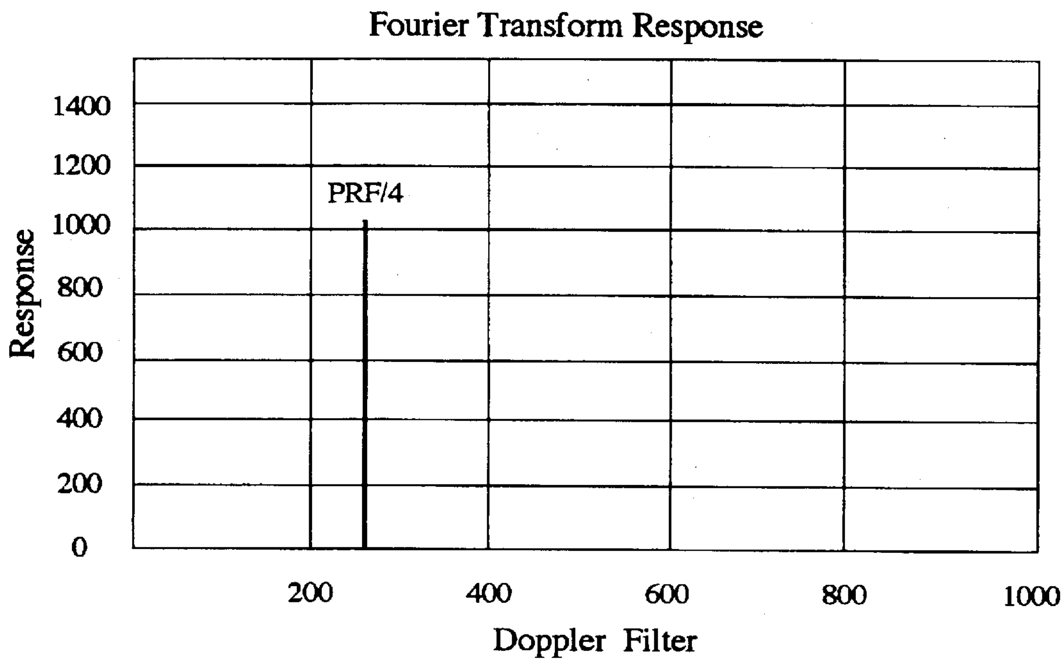
FIG. 4 shows the Fourier transform of the collected data of FIG. 3.
Figure 5:
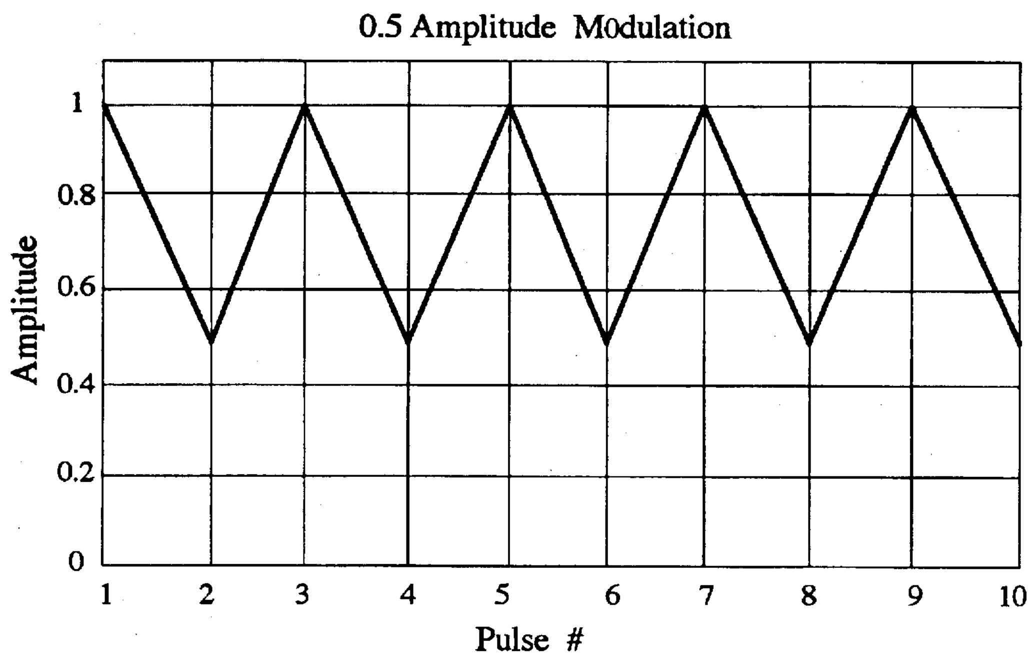
FIG. 5 shows typical amplitude modulation collected for the 0.5 attenuation level in the receive amplitude procedure in accordance with the invention.
Figure 6:
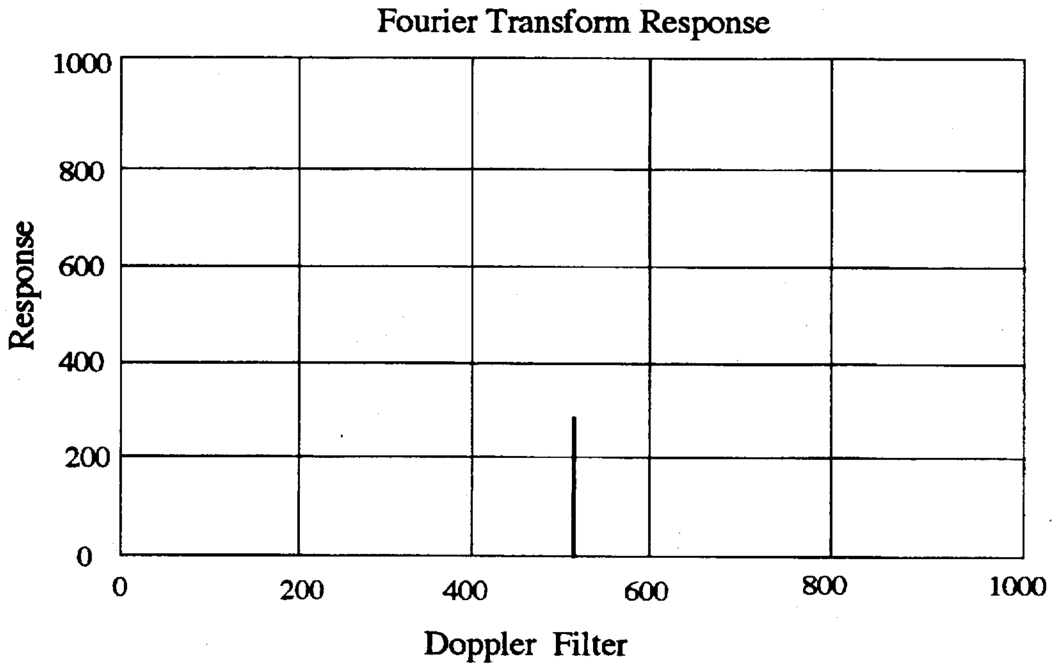
FIG. 6 shows the Fourier transform of the 0.5 amplitude modulation data of FIG. 5.
Figure 7:
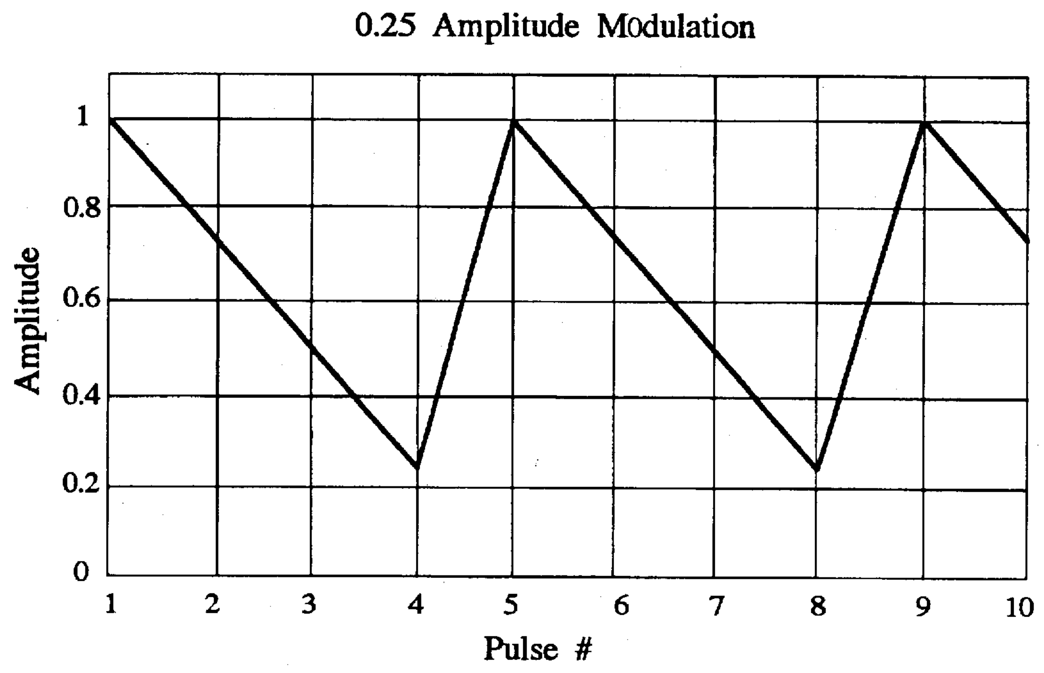
FIG. 7 shows typical amplitude modulation collected for the 0.25 attenuation level in the receive amplitude procedure in accordance with the invention.
Figure 8:
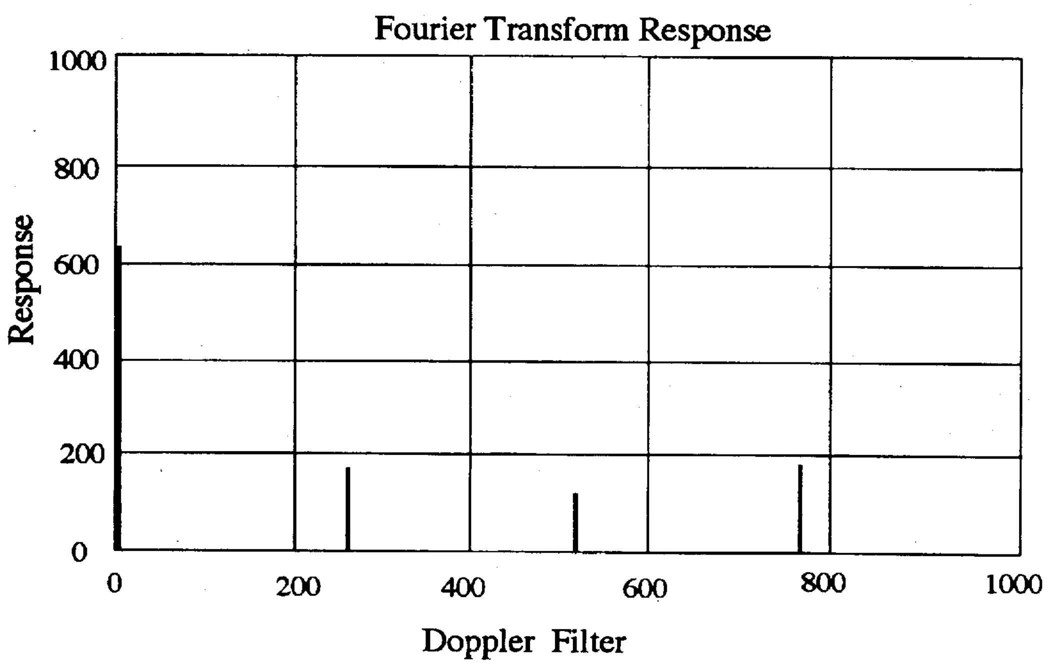
FIG. 8 shows the Fourier transform of the 0.25 amplitude modulation data of FIG. 7.

Using the modulation just described, data is collected, and a Fourier transform is performed on the collected data, as illustrated in FIGS. 1–4. FIG. 1 shows typical data collected for the 180 degree phase modulation. FIG. 2 shows the Fourier transform of the 180 degree phase modulation data of FIG. 1. Similarly, FIG. 3 shows typical data collected for the 90 degree phase modulation, and FIG. 4 the Fourier transform of this collected data.

Examination of FIGS. 1–4 confirms that a pulse-to-pulse phase increment of (360 degrees/N) yields a line in the Fourier transform spectrum at (PRF/N). The converse also holds true, so that a line at (PRF/N) implies a phase increment of (360 degrees/N). This allows for a check of the functionality of the module's phase shifter.

To arrive at the absolute phase difference between the transmit module and the receive module under test, the following formula is used. The absolute phase difference is the $\text{phase}_{transmit}$ (phase state 0) minus the $\text{phase}_{receive}$ (phase state 0), equal to $$\tan^{-1}[\Im(FS(PRF/N))/\Re(FS(PRF/N))] \quad \text{(eq.1)}$$

where s is the collected signal, phase state 0 is an arbitrary reference phase state, and FS(PRF/N) is the (PRF/N) filter of the Fourier transform of the signal s. In simplified terms, the relative phase difference between the transmit module and the receive module under test is the arc tangent of the resultant line in the FFT of the collected data.

The offset data resulting from the calibration can be used to provide corrections to the control signals applied by the beam forming computer 90 to steer the beam. Exemplary techniques for the application of this offset data to develop the corrections to the phase shifter commands are described in applicants' commonly assigned, co-pending application Ser. No. 08/642,033, filed May 2, 1996, "Self-Phase Up of Array Antennas With Non-Uniform Element Mutual Coupling and Arbitrary Lattice Orientations," Docket PD-94043, now U.S. Pat. No. 5,657,023 the entire contents of which are incorporated herein by this reference.

1(C). Receive Amplitude Procedure

The procedure begins by commanding the whole array to the safe state. A module next to the module under test is switched to the transmit state by using the T/R toggle command. The module under test is then amplitude modulated using the amplitude modulation mode command to decrement the amplitude from pulse to pulse. Data is collected and processed, and the derived amplitude offsets and states are stored in the calibration tables.

The process uses successive refining to test each of the bits in the test module's attenuation control. The first test is to ramp the attenuation 1.0, 0.5, 1.0, 0.5, and so on. The next test is to ramp the attenuation 1.00, 0.75, 0.50, 0.25, 1.00, 0.75, and so on. The process is repeated in the finest level on control of the module.

Using the previously described modulation, data is collected and a Fourier transform is performed on the collected data. Typical collected data and corresponding transform outputs are illustrated in FIGS. 5–8.

For a pulse-to-pulse attenuation increment of (1/N), N lines can be seen, starting at 0 and spaced every (PRF/N). The converse also holds true, so if there are N lines at (PRF/N), it can be seen that the corresponding attenuation increment was (1/N).

To derive the ratio of the amplitude differences between the two modules (the one in transmit and the other in receive), the following formula is used. The ratio of amplitude$_{transmit}$ (state 0) and amplitude$_{receive}$ (state 0) is equal to $$\frac{\left| FS\left(\frac{PRF}{2}\right)\right|}{\frac{N_{FFT}\cdot\Delta A}{2}} \quad \text{(eq. 2)}$$

where s is the modulated, time-domain, receive signal, state 0 is an arbitrary reference amplitude, (PRF/2) denotes the line at (PRF/2) in the Fourier Transform spectrum, (ΔA) is the attenuation increment (0.5, 0.25, etc.), ($N_{FFT}$) is the number of points in the FFT.

Figure 11:
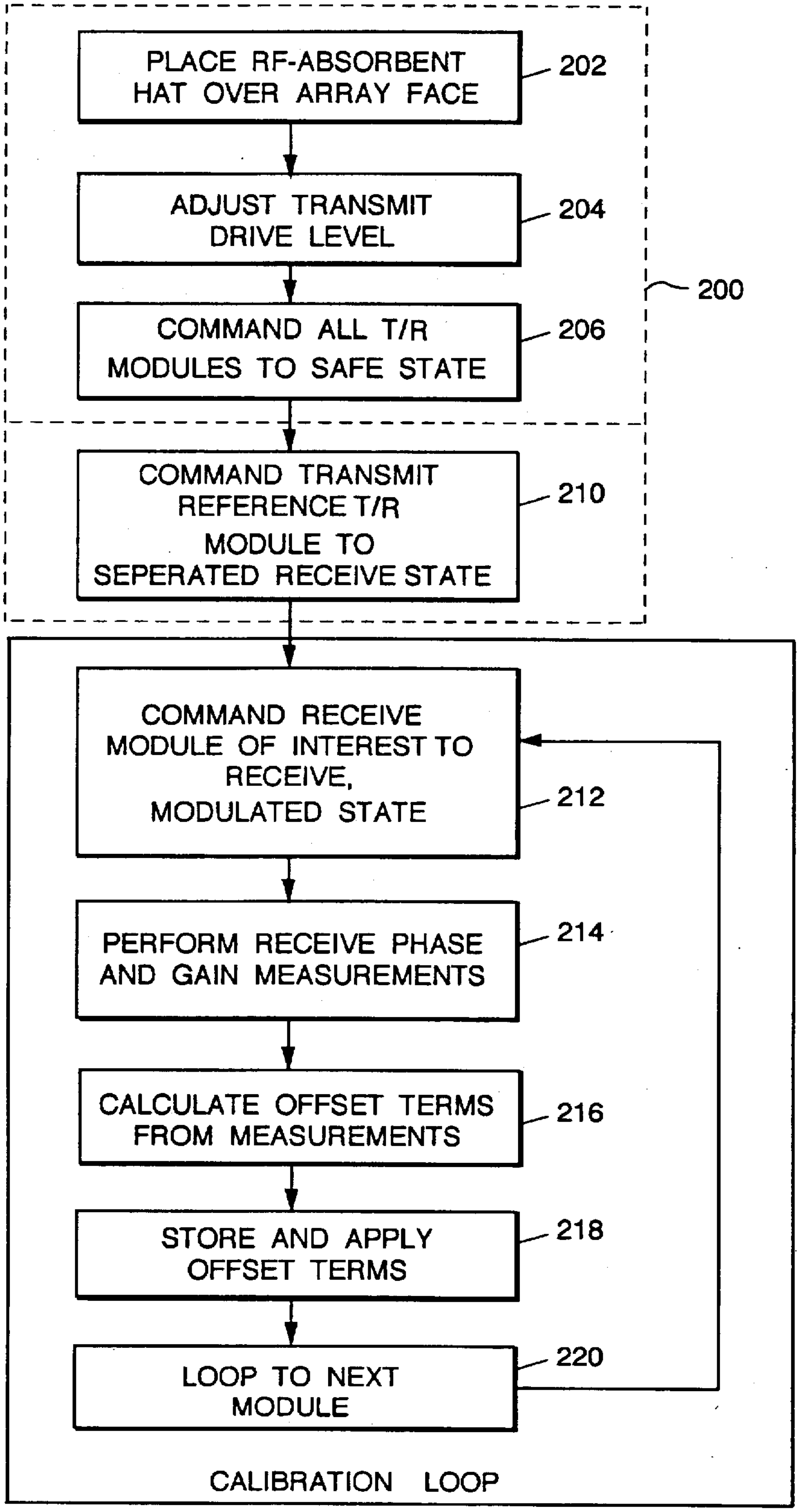
FIG. 11 is a flow diagram illustrating an exemplary receive calibration technique in accordance with the invention.

In an exemplary implementation, the receive amplitude and phase calibration procedures can both be completed for a given module before calibrating another module, as illustrated in the exemplary flow diagram of FIG. 11. As shown therein, the T/R module of interest is commanded to the receive mode, and to the modulated state (step 212). At step 214, the various phase and gain measurements are performed, wherein the gain and phase control assembly 118 is steps through the various gain and phase steps as described above. At step 216, the offset terms are calculated from the measurement data, using equations 1 and 2. At step 218, the offset terms are stored and applied. At step 220, operation loops to the next module for its calibration.

2(A). Transmit Calibration Procedure

Figure 14:
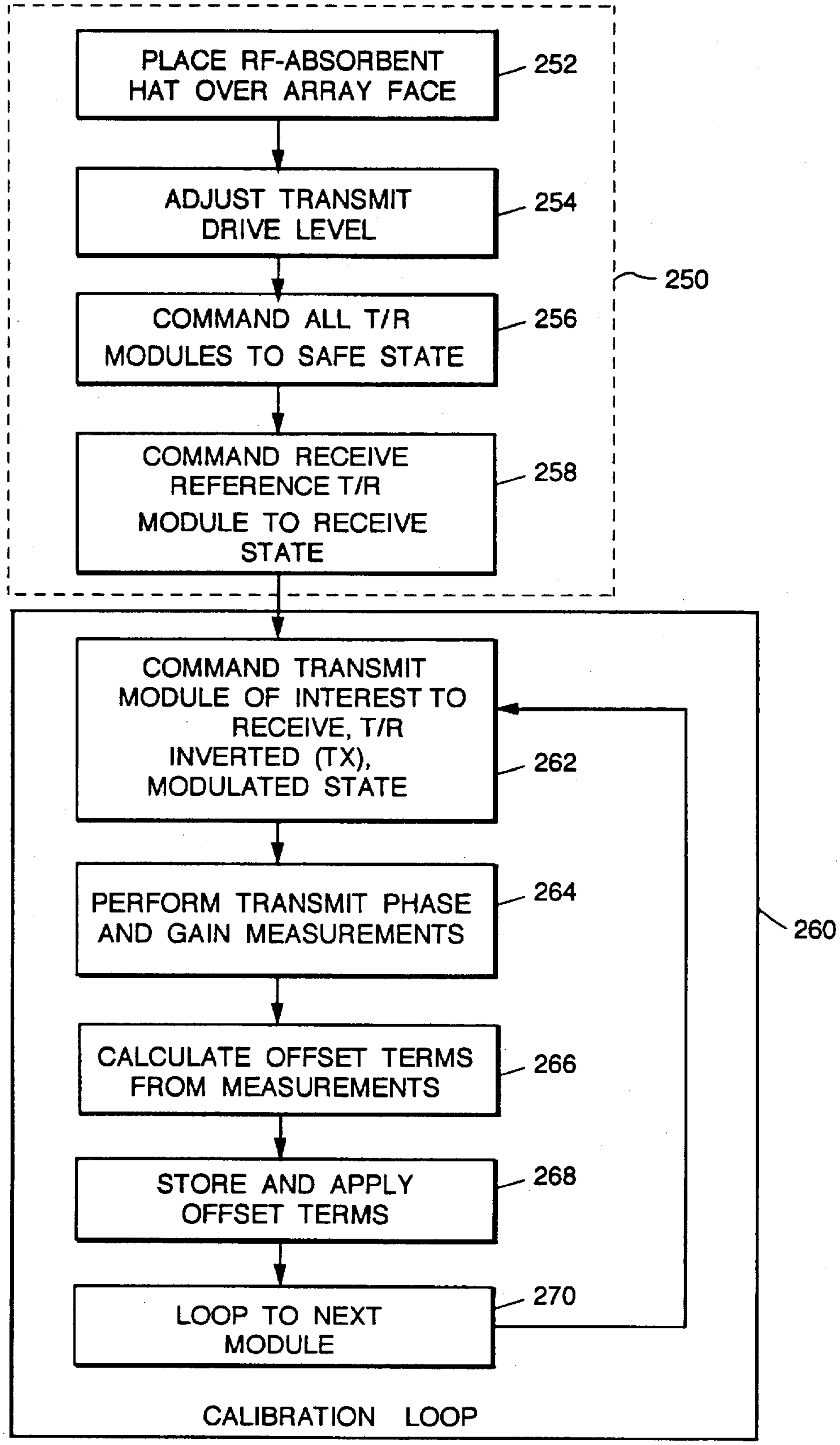
FIG. 14 is a flow diagram illustrating an exemplary transmit calibration technique in accordance with the invention.

The following procedure commands and test setups are used for all transmit calibration tests, as illustrated in the system setup procedure 250 (FIG. 14).

1. The radar absorbent hat (40) is placed over the array (60) to limit element-to-element signals to those due solely to mutual coupling (step 252).
2. The system may require a reduced transmit drive level dependent on module receive characteristics. The level of this drive shall be such that the coupled power from the transmit module at the input of the receive module shall be equal to the maximum allowable for linear operation of the receive module (step 254).
3. For the T/R modules not under test, the HPAs are enabled to approximate the operational array thermal environment during normal operation. The modules are otherwise disabled (LNA and gain/phase control circuitry disabled), so as not to transmit or receive (step 256).
4. In the calibration loop, for the receive reference module, the LNA (116) is enabled, and the T/R bit is set to normal.
5. In the calibration loop 260 (FIG. 14), for the transmit module under test, the HPA (112) is enabled, the T/R bit is set to inverted (T/R toggled to transmit), and the module is commanded into a mode using pulse-to-pulse phase or amplitude modulation to separate its signal in frequency from competing signals and leakages from the surrounding modules (step 262).

2(B). Transmit Phase Procedure

The transmit phase procedure is identical to the receive phase procedure with the following modifications:

1. The reference module is operated in a receive state.
2. The module under test is transmitting.

2(C). Transmit Amplitude Procedure

The transmit amplitude procedure is identical to the receive amplitude procedure with the following modifications:

1. The reference module is operated in a receive state.
2. The module under test is transmitting.

FIG. 14 shows the general transmit calibration procedure, wherein both the phase and amplitude calibrations are performed for a module. At step 264, the transmit phase and gain measurements are performed to collect the measurement data. At step 266, the offset terms are calculated from the measurement data. At step 268, the offset terms are stored and applied. Step 270 shows the process flow looping to the next module to be calibrated.

2(D). Transmit Calibration Limitations

The transmit portion of the calibration process works within certain limitations. The procedures here would provide tests for phase and amplitude control functionality, module-to-module phase and gain offsets, and measurements of the associated feed-structure phase and amplitudes.

3. Propagation of Error Effects (Clumping)

Assuming that an accurate measurement can be made from module to module, there still is the issue of the residual error in this measurement. If an error of size Δ is created from module to module, a maximum error of (nx+ny)Δ would be created across the array face due to the cascading of the independent measurements. The cumulative effects of this excess error could be prohibitive.

Figure 9A:
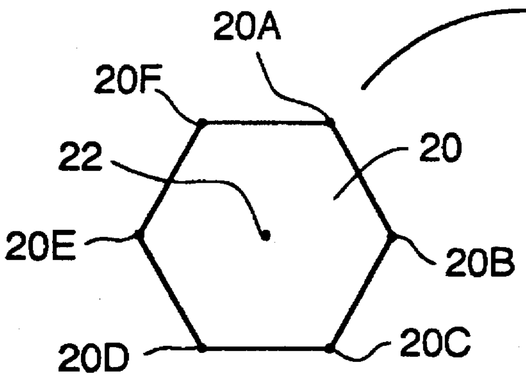
FIGS. 9 and 10 show a "clumping" technique to minimize propagation of error effects for rhombic and rectangular lattices, respectively.
Figure 9B:
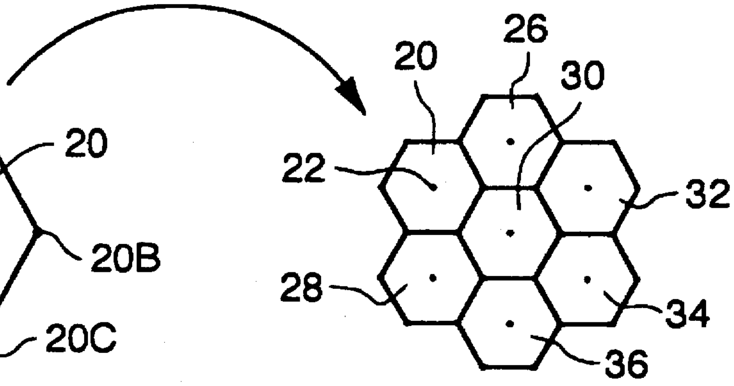

A "clump" is defined as a group of elements in proximity to a central reference element. FIGS. 9A and 9B illustrate a triangular lattice. A clump 20 in FIG. 9A includes a center reference element 22 surrounded by elements 20A–20F. The previous procedures collect the phase and amplitude offsets from the central element 22. These offsets are then used to command the surrounding modules connected to elements 20A–20F to the same phase and amplitude (within Δ) as the central element 22. FIG. 9B depicts a clump of clumps, wherein clumps 20, 26, 28, 32, 34, 36 surround a center clump 30. Adjacent clumps are then calibrated with respect to a central clump by comparing offsets from adjacent bordering elements. The process is repeated recursively until the array is calibrated. Using this technique, the maximum error across the array should be on the order of $\log_z(nx*ny)*\Delta$, where z equals the number of elements within a clump.

Figure 10A:
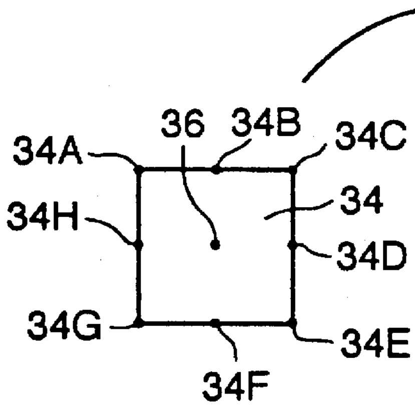
Figure 10B:
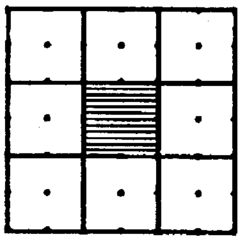

FIG. 10A is similar to FIG. 9A, but shows a rectangular lattice arrangement, wherein a clump 34 is defined by a center element 36 surrounded by elements 34A–34H. FIG. 10B shows a clump of clumps of elements in the rectangular lattice.

System Requirements

The following requirements are placed on the system for self-calibration:

T/R Module Requirements:

1. Modules must support logic inversion of the transmit/receive command.
2. Modules or beam forming computer must support pulse-to-pulse and amplitude modulation functions for all control bits.
3. Modules must have selective enable capability. That is, HPAs and LNAs can be enabled and disabled through logic commands.
4. Modules (active array elements) must be capable of linear receive operation with the power levels used for this testing.
5. The array system must support single-element receive measurement while transmit drive excitation is applied.

Figure 13:
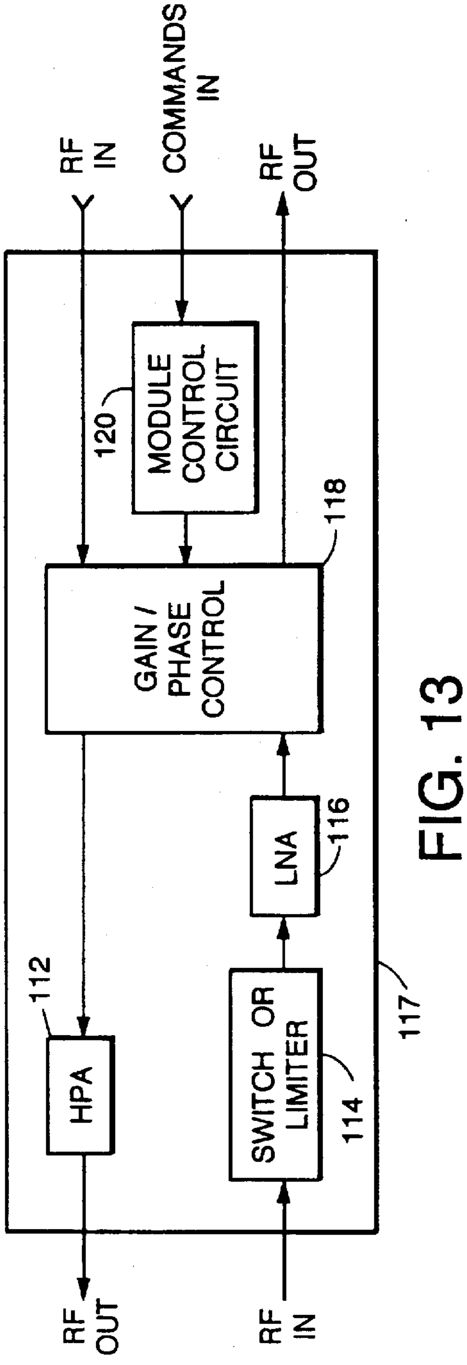
FIG. 13 is a block diagram of a transmit/receive module embodying the invention.

FIGS. 12 and 13 illustrate in block diagram a system 50 meeting these requirements. The system includes an array 60, which comprises a plurality of radiating elements 62A–62F, each of which is connected to a corresponding T/R module. FIG. 13 shows an exemplary one of the T/R modules 110. A transmit drive source 70 is connected to the array to drive the radiating elements, typically through a feed network comprising the array. A receiver 80 is responsive to signals received at the radiating elements and collected through the T/R modules and a receive feed. The receiver provides complex I/R receive data to a data reduction and offset calculation computer 100. A beam forming computer 90 provides digital commands to the T/R modules to set the array to form a desired beam steered in a given direction. The beam forming computer applies offset data calculated by the computer 100 as a result of the array self-calibration, in order to accurately form the beam.

The T/R modules are represented by exemplary module 110 in FIG. 13. The RF signal from the transmit source is passed through a gain and phase control assembly 118, which includes independently controllable gain/attenuator stages and phase shifters, which are adjusted during the calibration mode as described above. The digital commands from the computer 90 are sent to the module control circuit (MCC) 120, which in turn controls the gain and phase shifter settings of assembly 118. The output from the gain setting stages of assembly 118 is then passed through the high power amplifier (HPA) 112 which amplifies the transmit signal and passes the amplified signal on to the corresponding radiating element. On receive, the signal from the radiating element is passed through a switch or limiter 114, then through a low noise amplifier (LNA) 116, and the amplified signal on receive is passed through the gain and phase control assembly 118 to be appropriately attenuated/amplified and phase shifted according to the instructions from the beam forming computer 90. The received RF output signal is then passed to the receiver 80.

In an exemplary calibration, one module will be commanded to the transmit mode, say element 62D, an adjacent module will be commanded to the receive mode, say the module for element 62C, and the remaining modules for elements 62A, 62B, 62E and 62F will be commanded to the safe state.

Test Requirements

The following requirements are placed on the test for array self-calibration:

1. The array self-calibration is greatly simplified if there is only one path for energy to travel from one T/R module to another. The path of energy transfer which unavoidable is that of mutual coupling. Mutual coupling is defined as the dominant signal source, and a radar-absorbent hat 40 is placed over the array to eliminate possible unwanted reflected returns. A simple formula exist for the required absorbency of this hat:

$$\text{absorbency}=20\cdot\log_{10}(10^{(y/10)}-1) \quad \text{(eq.3)}$$

where Y=allocated hat error contribution (dB).

2. Interference signals and leakage signals from the modules not involved in the test have no modulation placed on them. This causes them to separate from the desired measurement signal on the output of the Fourier transform. If these signals are of sufficient strength, the Fourier transform filter sidelobes of this return may interfere with the measurements of the one of the modulation lines. The solution to this problem is to limit the size of the interference signals where practical, and to collect larger data sets for FFT processing, thus giving finer filters.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for receive self calibration of an active RF antenna array system comprising a plurality of radiating elements arranged in an array aperture, a corresponding plurality of transmit/receive modules each including independently adjustable phase shifting circuitry, a transmit signal source for providing transmit signals and a receiver responsive to the signals received through the radiating elements and T/R modules to provide a receiver signal, the method comprising the following steps:

(a) placing a radar absorbing hat over the array aperture;

(b) setting the transmit drive to an appropriate level to obtain linear operation of the receive module;

(c) setting a given T/R module under test to a receive state;

(d) setting a reference T/R module to a transmit state;

(e) setting all other T/R modules in the array except the module under test and the reference module to a safe state so as not to transmit or receive through said other modules;

(f) receiving pulses of RF energy at the module under test via its corresponding radiating element which has been transmitted through the reference module via its corresponding radiating element;

(g) changing the state of the phase shifting circuitry of the receive module under test on a pulse-to-pulse or between groups of pulses to add phase modulation to the received pulses of energy to collect measurement data;

(h) analyzing the measurement data to determine the relative phase difference between the transmit module and the receive module under test;

(i) repeating the calibration for other modules in the array to obtain a set of data indicating the relative phase differences between the modules in the array, wherein only one module is transmitting and only one module is receiving during a test of a module under test; and (j) storing the set of data for use in setting the phase shifters for accurate receive beam forming.

2. The method of claim 1 wherein the step of changing the state of the phase shifting circuitry comprises incrementing the phase shift applied by the phase shifting circuitry between pulses, and the step of analyzing the measurement data comprises performing a Fourier transform on the collected data.

3. The method of claim 2 wherein the step of analyzing the measurement data further comprises analyzing the Fourier transform spectrum for lines at expected values corresponding to the phase shift increment.

4. The method of claim 1 wherein the T/R modules include a high power amplifier for transmit operation, and those T/R modules set to the safe state have their high power amplifiers enabled to the extent necessary to approximate the array thermal environment during normal operation.

5. The method of claim 1 wherein each T/R module further includes independently controllable gain control circuitry to vary the power of signals passed through the module, and wherein the method further includes a method for amplitude calibration of the T/R modules, comprising the following steps:

for the module under test, changing the gain control circuitry of the module under test from pulse-to-pulse or between groups of pulses to apply amplitude modulation to the received signal;

analyzing the measurement data to determine the relative amplitude difference between the transmit module and the receive module under test;

repeating the calibration for other modules in the array to obtain a set of data indicating the relative amplitude differences between the modules in the array, wherein only one module is transmitting and only one module is receiving during a test of a module under test; and (j) storing the set of data for use in setting the gain control circuitry during normal operation.

6. The method of claim 5 wherein the step of changing the gain control circuitry includes decrementing the received amplitude from pulse to pulse, and the step of analyzing the measurement data comprises performing a Fourier transform on the measurement data.

7. A method for transmit self calibration of an active RF antenna array system comprising a plurality of radiating elements arranged in an array aperture, a corresponding plurality of transmit/receive modules each including independently adjustable phase shifting circuitry, a transmit signal source for providing transmit signals and a receiver responsive to the signals received through the radiating elements and T/R modules to provide a receiver signal, the method comprising the following steps:

(a) placing a radar absorbing hat over the array aperture;

(b) setting the transmit drive to an appropriate level to obtain linear operation of the receive module;

(c) setting a given T/R module under test to a transmit state;

(d) setting a reference T/R module to a receive state;

(e) setting all other T/R modules in the array except the module under test and the reference module to a safe state so as not to transmit or receive through said other modules;

(f) receiving pulses of RF energy at the module under test via its corresponding radiating element which has been transmitted through the module under test via its corresponding radiating element;

(g) changing the state of the phase shifting circuitry of the module under test on a pulse-to-pulse or between groups of pulses to add phase modulation to the received pulses of energy to collect measurement data;

(h) analyzing the measurement data to determine the relative phase difference between the module under test and the reference module;

(i) repeating the calibration for other modules in the array to obtain a set of data indicating the relative phase differences between the modules in the array, wherein only one module is transmitting and only one module is receiving during a test of a module under test; and (j) storing the set of data for use in setting the phase shifters for accurate transmit beam forming.

8. The method of claim 7 wherein the step of changing the state of the phase shifting circuitry comprises incrementing the phase shift applied by the phase shifting circuitry between pulses, and the step of analyzing the measurement data comprises performing a Fourier transform on the collected data.

9. The method of claim 8 wherein the step of analyzing the measurement data further comprises analyzing the Fourier transform spectrum for lines at expected values corresponding to the phase shift increment.

10. The method of claim 7 wherein the T/R modules include a high power amplifier for transmit operation, and those T/R modules set to the safe state have their high power amplifiers enabled to the extent necessary to approximate the array thermal environment during normal operation.

11. The method of claim 7 wherein each T/R module further includes independently controllable gain control circuitry to vary the power of signals passed through the module, and wherein the method further includes a method for amplitude calibration of the T/R modules, comprising the following steps:

for the module under test, changing the gain control circuitry of the module under test from pulse-to-pulse or between groups of pulses to apply amplitude modulation to the received signal;

analyzing the measurement data to determine the relative amplitude difference between the module under test and the reference module;

repeating the calibration for other modules in the array to obtain a set of data indicating the relative amplitude differences between the modules in the array, wherein only one module is transmitting and only one module is receiving during a test of a module under test; and (j) storing the set of data for use in setting the gain control circuitry during normal operation.

12. The method of claim 11 wherein the step of changing the gain control circuitry includes decrementing the amplitude from pulse to pulse, and the step of analyzing the measurement data comprises performing a Fourier transform on the measurement data.

* * * * *